(12) United States Patent
Wilhelm et al.

(10) Patent No.: US 8,840,163 B1
(45) Date of Patent: Sep. 23, 2014

(54) ENERGY ATTENUTATING SEAT AND LITTER SUPPORT

(71) Applicant: Armorworks Enterprises, LLC, Chandler, AZ (US)

(72) Inventors: Terry Wilhelm, Gilbert, AZ (US); Joshua Platt, Concord, CA (US)

(73) Assignee: Armorworks Enterprises LLC, Chandler, AZ (US)

( * ) Notice: Subject to any disclaimer, the term of this patent is extended or adjusted under 35 U.S.C. 154(b) by 0 days.

(21) Appl. No.: 13/750,327

(22) Filed: Jan. 25, 2013

Related U.S. Application Data

(60) Provisional application No. 61/592,069, filed on Jan. 30, 2012.

(51) Int. Cl.
*A61G 3/00* (2006.01)
*B60N 2/42* (2006.01)

(52) U.S. Cl.
CPC . *A61G 3/006* (2013.01); *B60N 2/42* (2013.01)
USPC .......................................... 296/19; 296/68.1

(58) Field of Classification Search
CPC ........ A61G 3/00; B62D 21/152; F41H 7/044; B60N 2/3011; B60N 2/305; B60N 2/366
USPC ............. 296/65.05, 65.09, 65.16, 19, 187.03, 296/187.07, 68.1
See application file for complete search history.

(56) References Cited

U.S. PATENT DOCUMENTS

| | | | |
|---|---|---|---|
| 2,337,505 A | 12/1943 | Swift | |
| 4,115,884 A | 9/1978 | Keogh | |
| 4,178,032 A | 12/1979 | Hone | |
| 4,378,128 A | 3/1983 | Holling et al. | |
| 5,383,629 A * | 1/1995 | Morgan | 244/118.6 |
| 6,152,401 A | 11/2000 | Green | |
| 6,450,449 B1 | 9/2002 | Podob et al. | |
| 6,923,606 B2 | 8/2005 | Fehrle et al. | |
| 7,621,580 B2 | 11/2009 | Randjelovic et al. | |
| 7,883,133 B2 | 2/2011 | Chinn | |
| 7,938,485 B1 * | 5/2011 | Perciballi et al. | 297/216.1 |
| 8,104,121 B2 | 1/2012 | Bourgraf et al. | |
| 8,205,703 B2 | 6/2012 | Halliday | |
| 8,240,605 B2 | 8/2012 | Cremers et al. | |
| 8,382,181 B2 * | 2/2013 | Bourgraf et al. | 296/19 |
| 8,602,475 B2 * | 12/2013 | Fletcher et al. | 296/19 |
| 2007/0052256 A1 * | 3/2007 | Trombley et al. | 296/65.09 |
| 2013/0233999 A1 * | 9/2013 | Chinn | 248/581 |

* cited by examiner

*Primary Examiner* — Dennis H Pedder
*Assistant Examiner* — Beverly Becker
(74) *Attorney, Agent, or Firm* — James L. Farmer

(57) ABSTRACT

Methods and apparatus are provided for an energy attenuating seat and litter support for use in a vehicle. In one exemplary embodiment the energy attenuating seat and litter support includes a seat with a folding back that is lockable in both an upright position for seating, and a folded down, horizontal position. The exemplary embodiment may further comprise a litter mounting fixture accessible when the seat back is in the folded down, horizontal position, and an energy attenuation device disposed to provide energy attenuation for a litter supported by the litter mounting fixture.

10 Claims, 12 Drawing Sheets

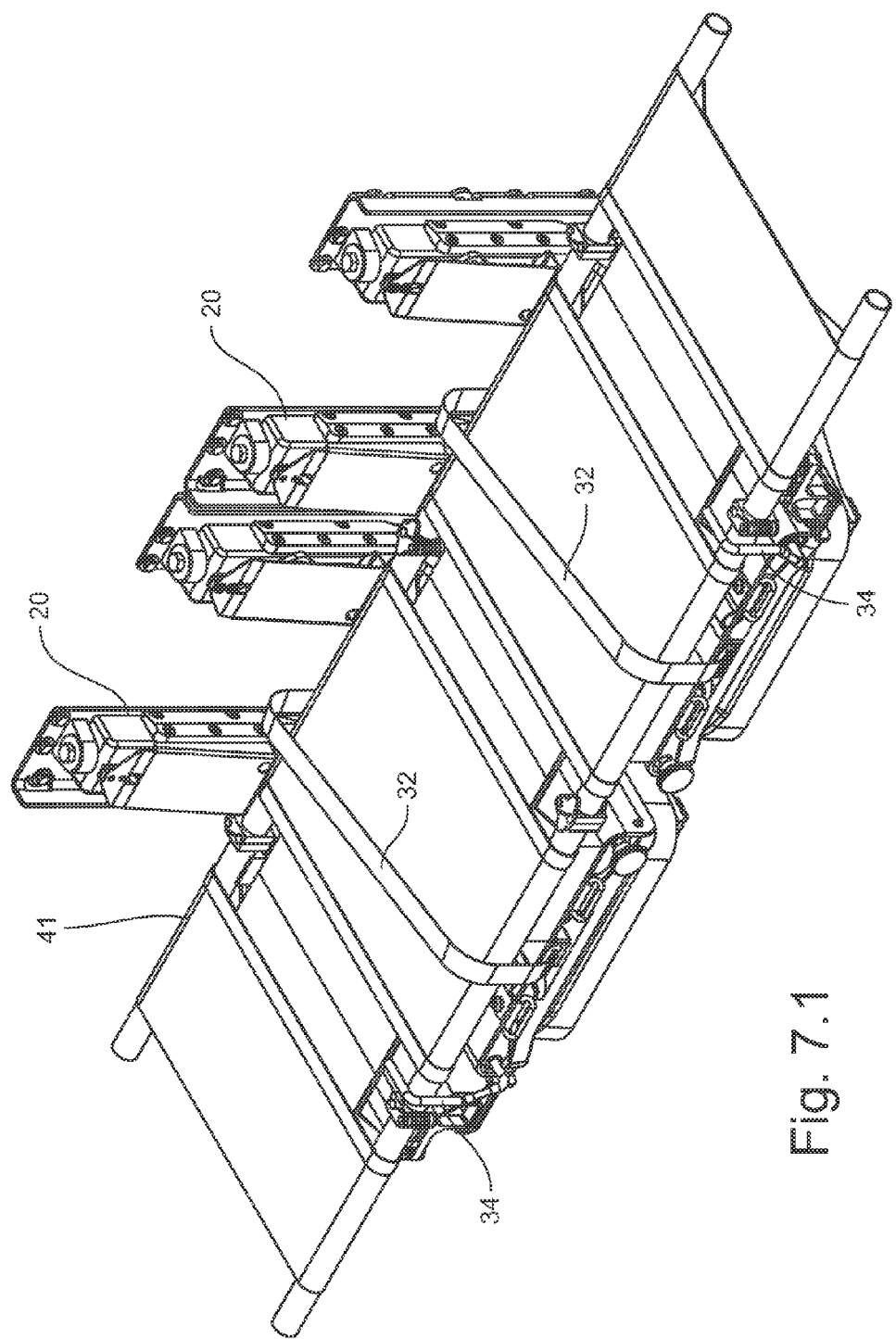

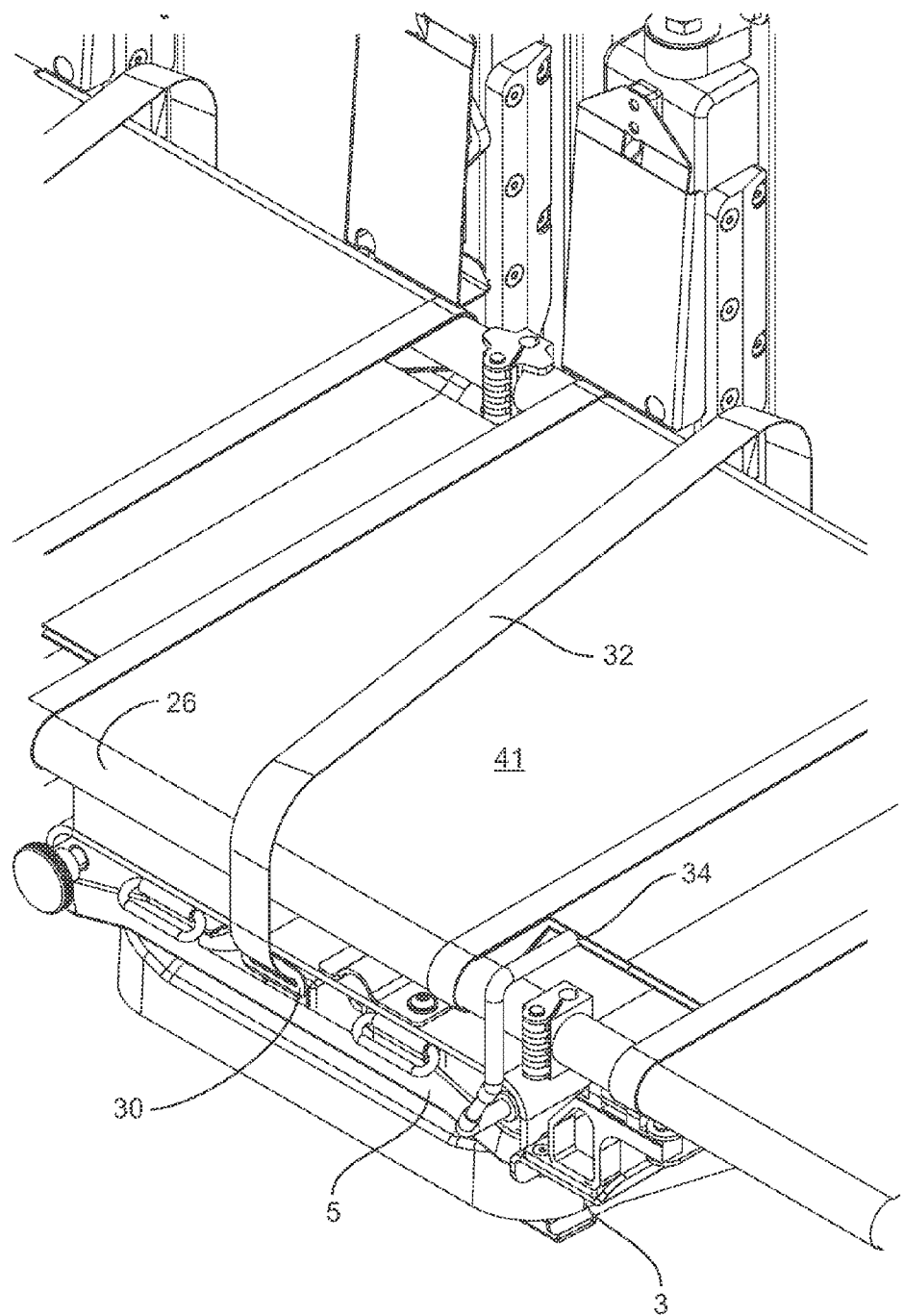
Fig. 7.2

ENERGY ATTENUTATING SEAT AND LITTER SUPPORT

This application claims the benefit of U.S. Provisional Application No. 61/592,069, filed Jan. 30, 2012, the entire contents of which are hereby incorporated by reference.

TECHNICAL FIELD AND BACKGROUND

The technical field of the present disclosure may include military vehicles adapted for troop transport. The technical field may further include energy attenuation devices used in such vehicles for protecting vehicle occupants in an under vehicle mine blast or other potentially lethal, high energy event.

BRIEF DESCRIPTION OF THE DRAWINGS

In the accompanying drawings:

FIGS. 7.1 and 7.2 are perspective views at different scales of two of the seats of FIG. 6 arranged side-by-side and supporting a medical litter;

DESCRIPTION OF THE EMBODIMENTS

Figure 1:
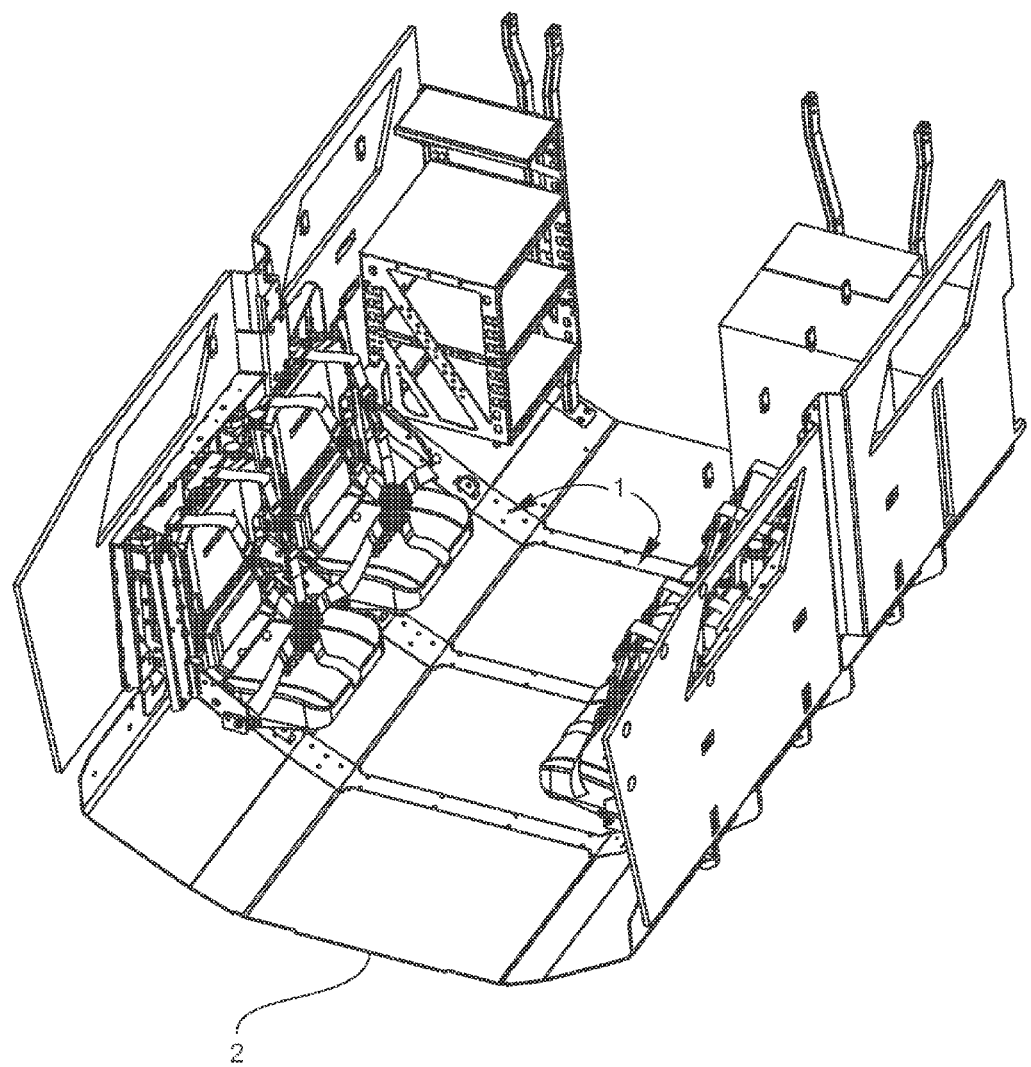
FIG. 1 is a perspective view of vehicle crew compartment containing two pairs of an energy attenuating seat and litter support in accordance with the present disclosure.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom. The term "vehicle" as used herein is intended to mean any person carrying structure, including but not limited to all types of land vehicles, aircraft, watercraft, rockets, spacecraft, and the like. As used herein, the term "aircraft" is intended to denote any airborne vehicle including but not limited to airplanes, jets, gliders, helicopters, and lighter-than-air craft.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing figures, an exemplary energy attenuating ("EA") seat and litter support in accordance with the present disclosure is indicated generally at reference numeral 1. EA seats are typically employed to mitigate the severe shock loads associated with under vehicle mine blasts, helicopter crashes, or other impact type events involving sudden relative acceleration between the seat and the structure supporting the seat. Many EA seats utilize some form of crushable member between the seat and the structure supporting the seat to absorb the energy of the event. The EA mechanism is typically oriented to stroke in the direction of the anticipated shock load, such as toward the floor of a vehicle or aircraft, although additional EA supports may be included to account for shock loads from more than one direction. EA seats are disclosed for example in issued U.S. Pat. No. 7,938,485, and co-pending U.S. patent application Ser. Nos. 12/806,373, and 13/187,701, all of which are assigned to the assignee of the instant invention, and hereby incorporated by reference. The EA seat and litter support of the present disclosure may be deployed in side-by-side, inward facing seat rows along the sides of a vehicle compartment 2, for example, in the manner shown in FIG. 1. As will be explained in greater detail below, two or more adjacent EA seats in a row may be converted to serve double duty as an energy attenuating litter support.

Figure 2:
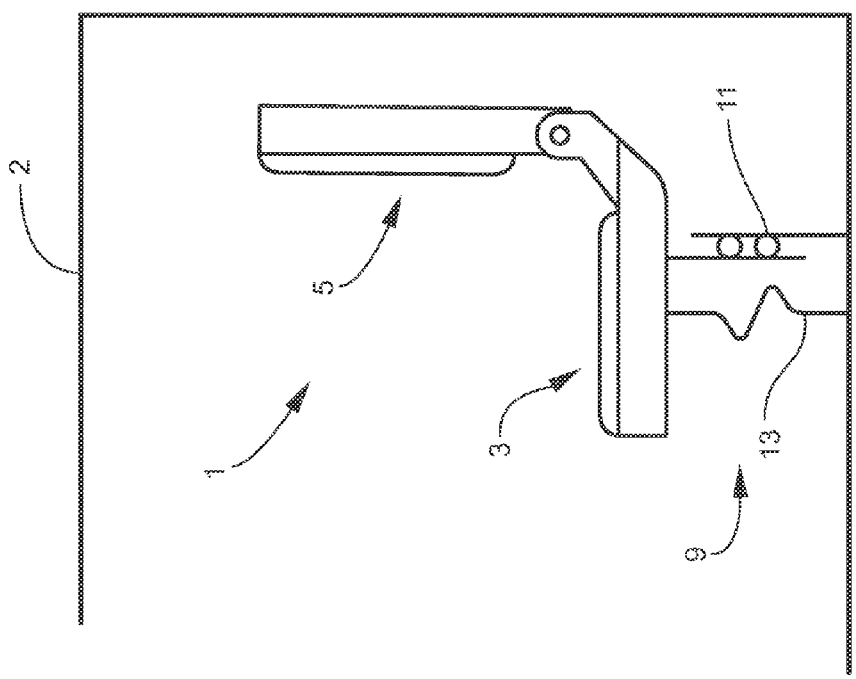
FIG. 2 is a schematic side view of another exemplary energy attenuating seat and litter support of the present disclosure.

Referring now to FIG. 2, an exemplary EA seat 1 in accordance with the present disclosure comprises generally a seat bottom 3, a folding seat back 5, and an EA seat mount 9. The EA seat mount 9 comprises fundamentally a seat guide 11 adapted to enforce guided vertical movement of seat 1, and one or more EA links 13 supporting the seat from the compartment, in this case supported vertically from a compartment floor. The seat guide 11 includes a fixed portion connected directly or indirectly to the compartment 2, and a moving portion connected directly or indirectly to the seat 1. The fixed and moving portions are constrained together by rollers, slides, or other suitable guide mechanism configured to allow only unidirectional relative motion.

The one or more EA links 13 may comprise one or more crushable or extensible members that are initially rigid and strong enough to support the weight and G-loads of an occupied seat 1 under non-extreme accelerations, yet capable of deforming in a controlled manner and absorbing the energy of a catastrophic impact event. The EA link 13, may, for example, be an elongated bar with multiple bends and straight sections, and comprise any generally rigid, yet deformable metal, such as aluminum or steel. Alternatively, EA link 13 may comprise any other crushable or extensible EA structure known in the art, such as crush tubes and the like. In addition, the EA link 13 may be custom tailored to any particular application by modifying material properties, thicknesses, and/or shapes. For example, in one exemplary implementation the EA links 13 of an EA seat 1 may attenuate a vertical impact of a 6.5 meters-per-second impulse due to mine blast or improved explosive device (IED). An exemplary EA seat 1 may also be capable of withstanding road shock loads transmitted through a vehicle chassis structure of at least 10 G's vertical, and 8 G's longitudinal. Additional suitable EA link embodiments are disclosed in the above mentioned US Patents and patent applications owned by the assignee of the present invention, as well as US Design patent application Ser. No. 29/386,211, also assigned to the assignee of the instant invention, the entire contents of which are hereby incorporated by reference. Although EA link 13 may protect a seated occupant for multiple impact events, they are generally considered disposable and easily replaced to restore a maximum level of protection to the EA seat.

Figure 3:
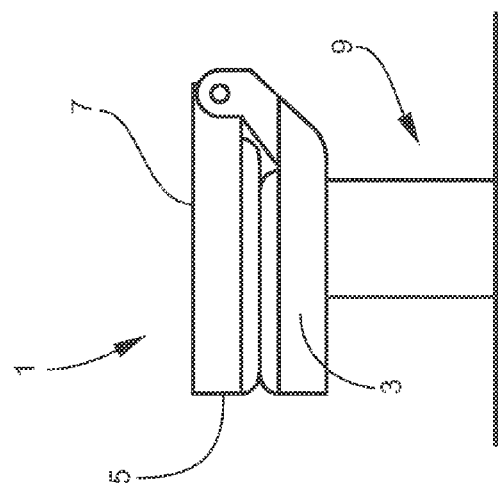
FIG. 3 is the energy attenuating seat and litter support of FIG. 2 with the seat back folded down in the litter support position.

Continuing now with the EA seat embodiment of FIG. 2, the seat back 5 is pivotally mounted to the seat frame, and may be folded down flat against seat bottom 3 as shown in FIG. 3. Suitable latches may be provided for locking and unlocking seat back 5 in the upright or folded down positions. In the folded down position of FIG. 3, the seat back 5 presents a stable, relatively flat horizontal surface 7. Accordingly, an elongated, flat, horizontal surface suitable for supporting a medical litter may be created by folding down the seat backs of two or more adjacent seats.

Figure 4:
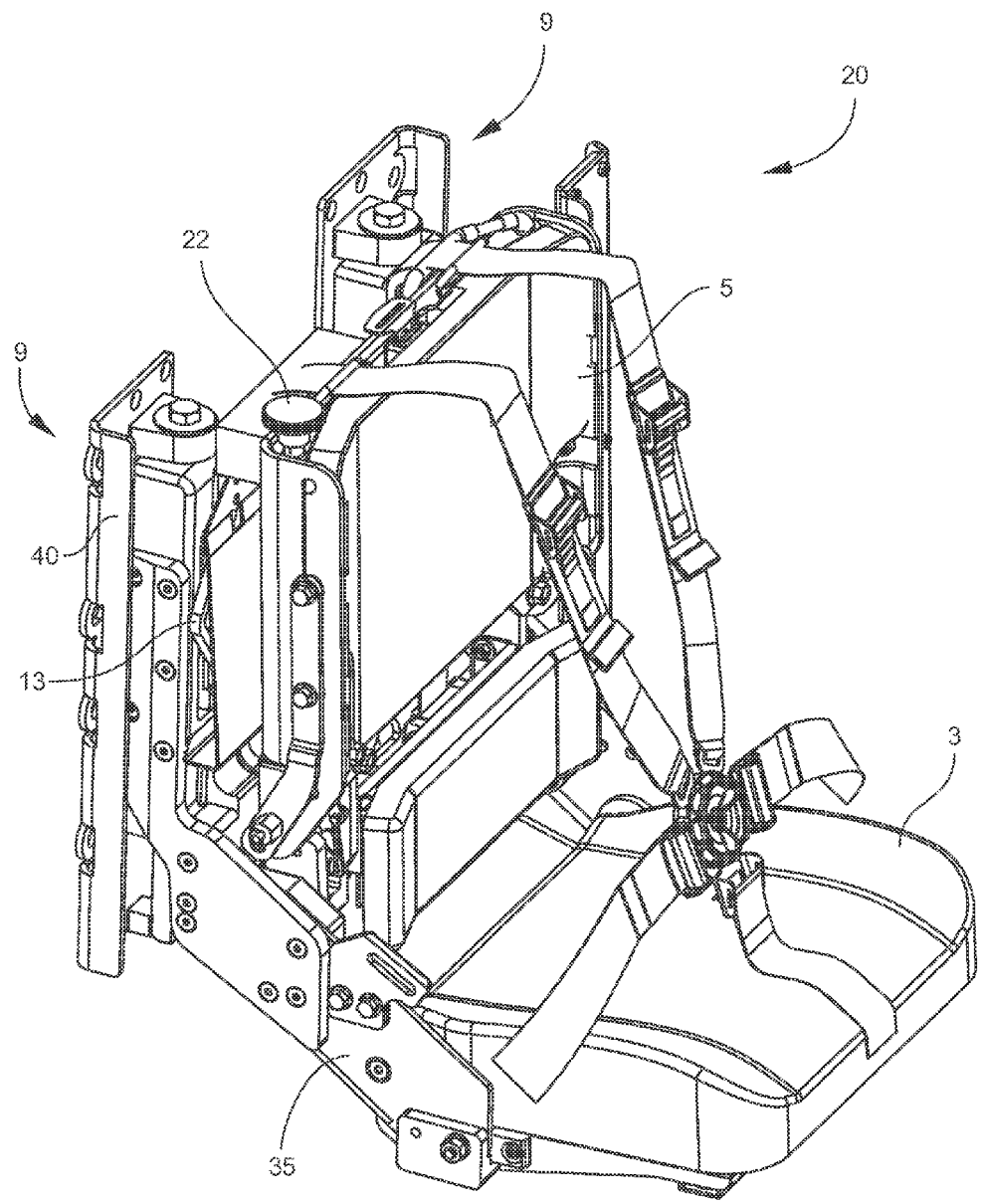
FIG. 4 is a perspective view of the energy attenuating seat and litter support shown in FIG. 1, with the seat back in the upright position for seating.
Figure 5:
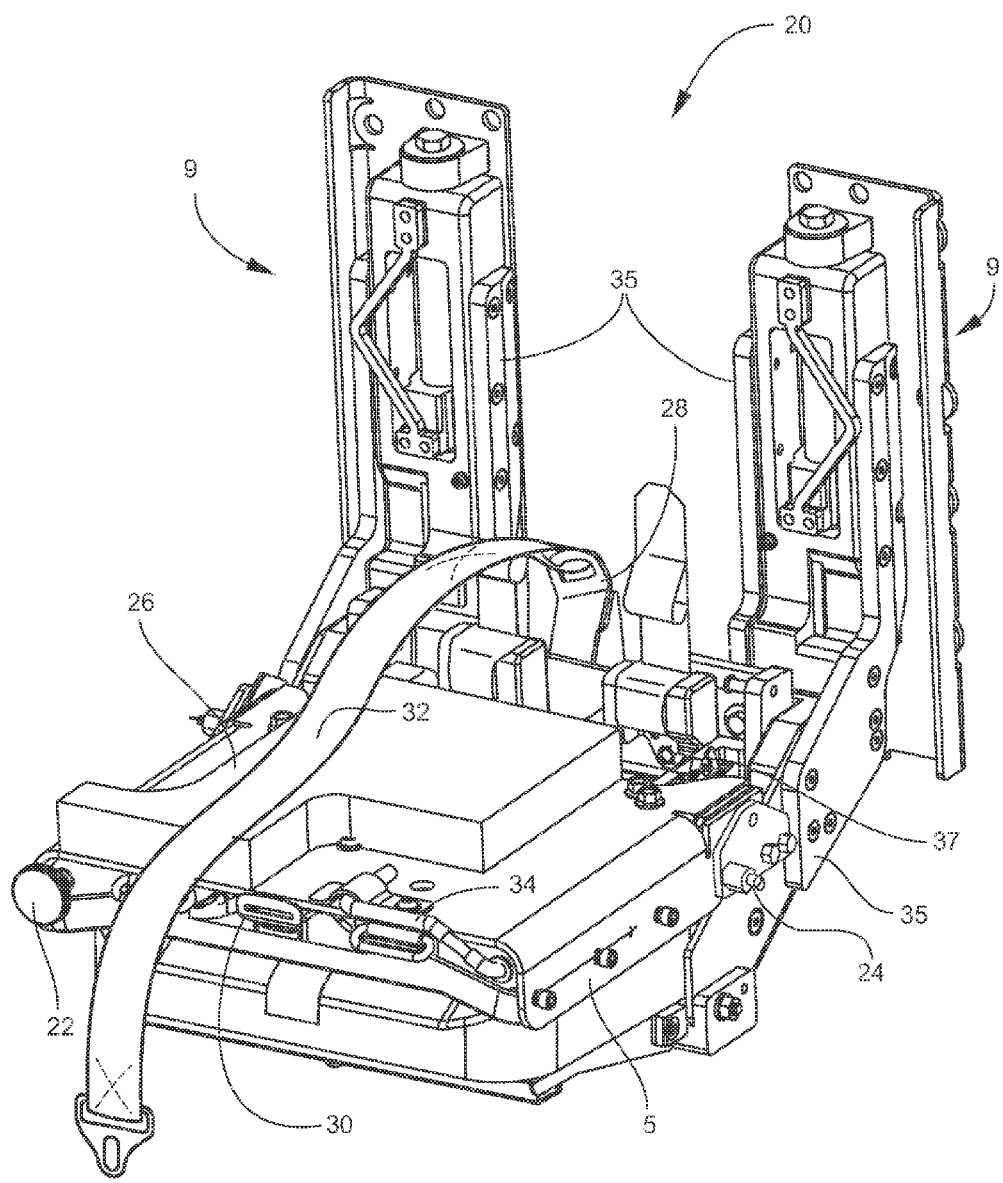
FIG. 5 is the seat of FIG. 4 with the seat back in the folded down, horizontal position for supporting a litter.
Figure 6:
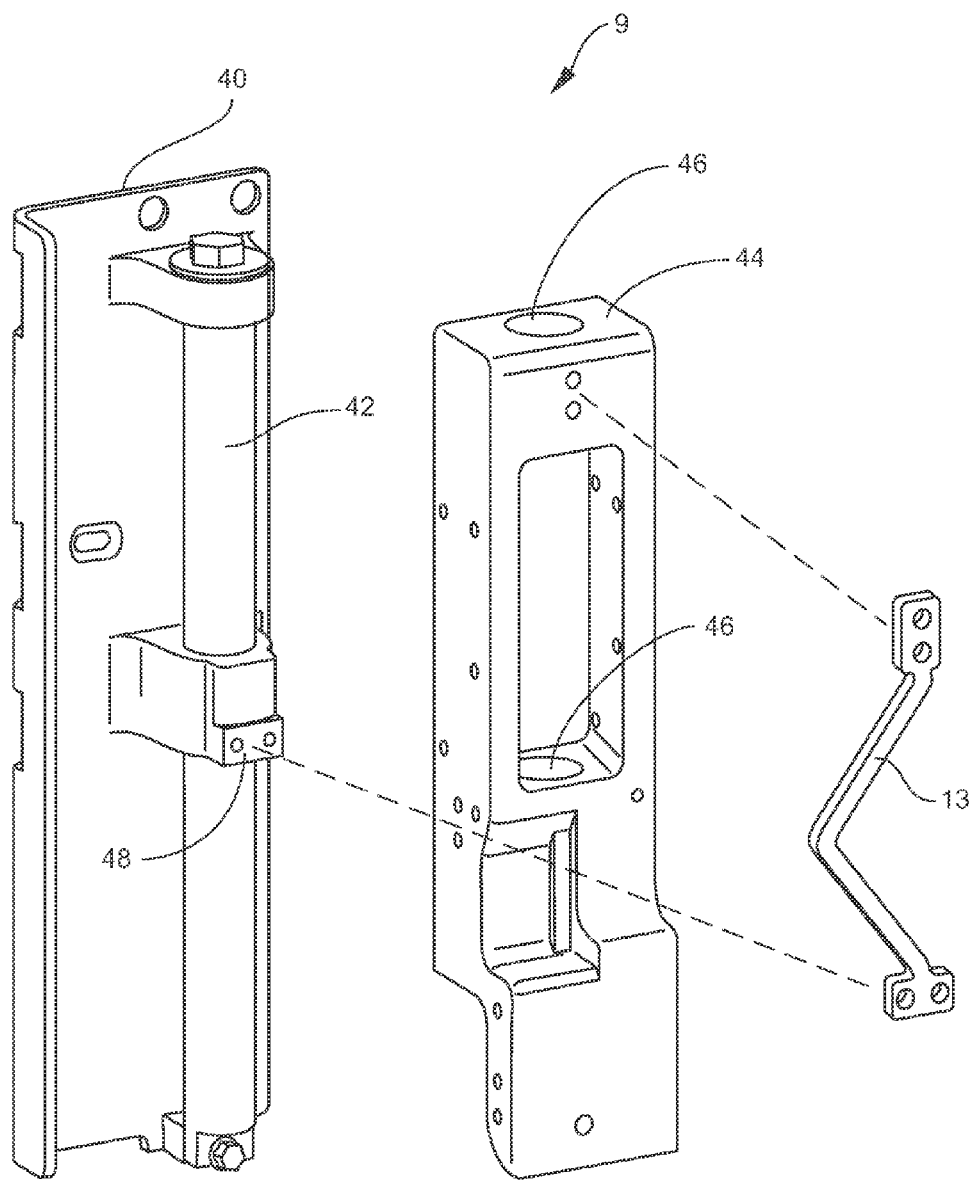
FIG. 6 is an exploded view of the energy attenuating mount of the seat shown in FIGS. 4 and 5.

Another embodiment of the convertible EA seat and litter support of the present disclosure is illustrated in FIGS. 4 through 6, and indicated generally at reference numeral 20. In this embodiment each seat is supported by two energy attenuating seat mounts 9 that are located behind the seat back 5 for attachment to a vertical structure or wall of the vehicle compartment. Referring particularly to FIG. 6, the EA mount 9 of seat 20 comprises a mounting bracket 40, guide bar 42, slide block 44, and an EA link 13. The mounting bracket 40 is adapted for bolting to the vehicle compartment, and it along with guide bar 42 comprises the fixed portion of the EA mount 9. Slide block 44 is slidably disposed on guide bar 42 via spaced apart through bores 46, and comprises the moveable portion of EA mount 9. Bolt holes on the sides of block 44 provide for attachment to seat 20 via seat frame members 35.

The EA link 13 is fastened at one end to the top of slide block 44, and at the other end to boss 48 of mounting bracket 40, as indicated by dashed lines in FIG. 6. The EA link 13 thus serves as a rigid brace supporting the seat 20 under non-catastrophic conditions by preventing block 44 from sliding along guide bar 42. The EA link may be metal bar fashioned with straight sections and bends as shown, or any of the alternative energy absorbing members discussed previously.

The seat back 5 of EA seat 20 is also configured to fold flat against the seat bottom 3 in the manner described above with reference to FIGS. 2 and 3. FIGS. 4 and 5 depict seat back 5 of seat 20 in the upright and folded down positions respectively. The seat 20 is equipped with a spring loaded locking device 37 for automatically locking the seat back 5 when lifted into the upright position of FIG. 4. Pulling upward on the seat back release knob 22 disengages the locking device 37, and allows the seat back to be folded down. A spring loaded locking pin 24 in seat frame 35 may be used to lock and unlock the seat back 5 to the seat bottom 3 when in the folded flat position of FIG. 5.

Seat 20 may further include various fixtures for supporting and restraining a medical stretcher on the folded down seat backs. For example, seat back 5 may include a foam pad 26 to provide a cushioned support surface for the stretcher and patient. Seat 20 may also include a restraining belt 32 extending from a rear belt bracket 28 and connectable to a front belt latch 30 for securely strapping the patient and stretcher down to the folded seats. A stretcher may be further secured with a spring loaded locking bar 34, shown in the stowed position in FIG. 5, by extending the bar 34 outward from the seat back and hooking it over the stretcher frame. FIGS. 7.1 and 7.2 show a medical stretcher positioned across the seat backs of a pair of folded down adjacent seats 20, secured there by restraining belts 32 and locking bars 34. Because the stretcher is supported by the seats 20, energy attenuation for the stretcher is provided by the seat EA mounts 9.

Figure 8:
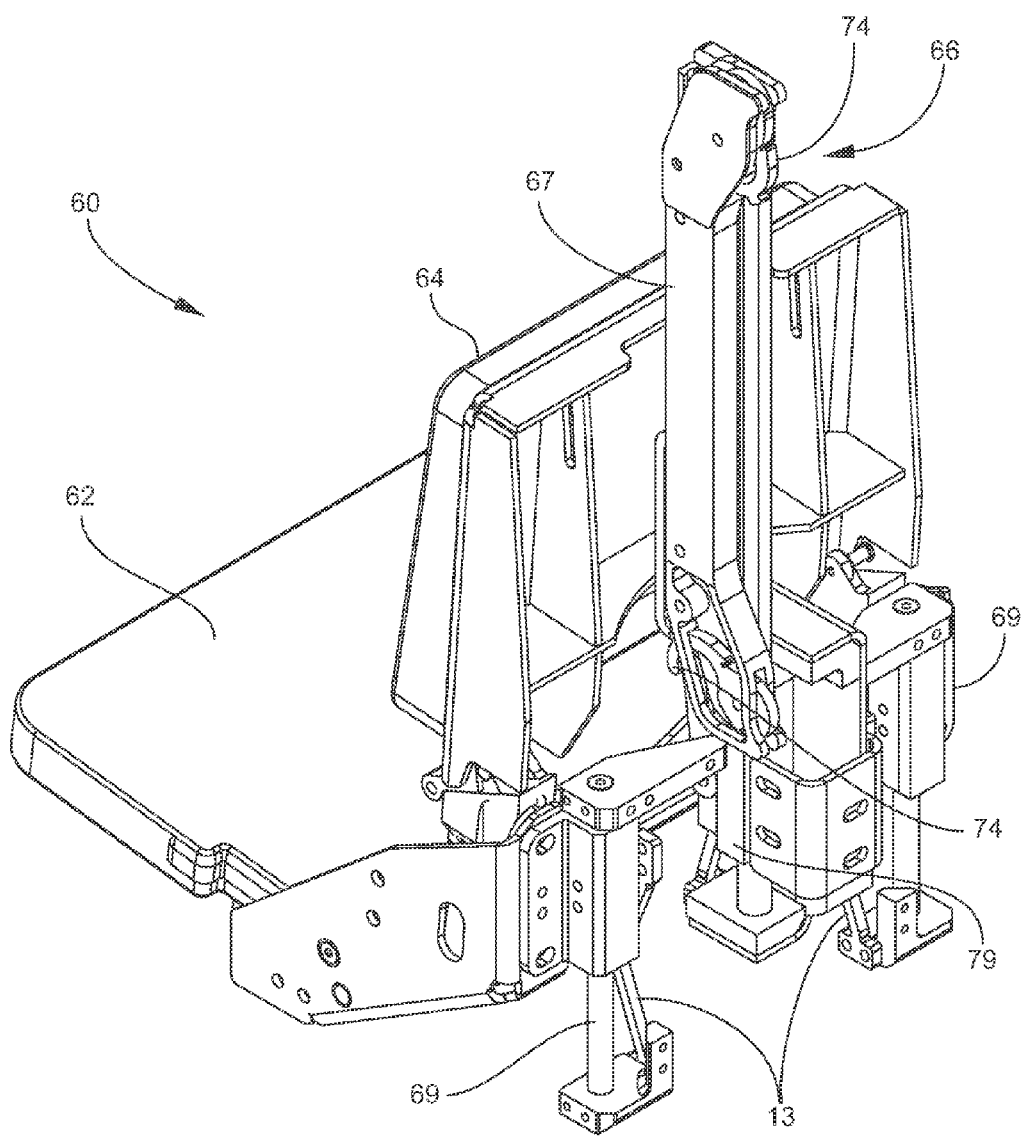
FIG. 8 is a perspective view of another embodiment of the energy attenuating seat and litter support with a folding litter support arm.
Figure 9:
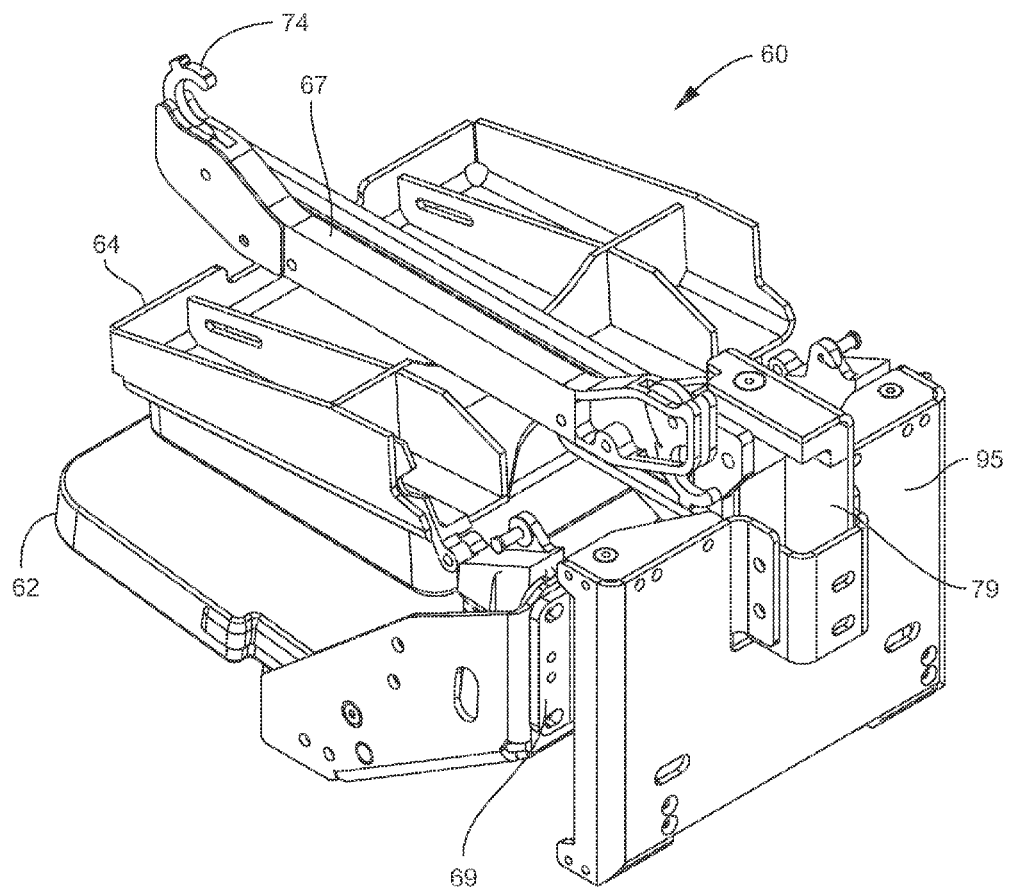
FIG. 9 is a perspective view of the seat and litter support of FIG. 8 with the seat back and litter support arm folded down for receiving a medical litter.

Another embodiment of the convertible EA seat and litter support is shown in FIGS. 8 and 9. Similar to the previous embodiments, EA seat 60 includes a seat bottom 62, and a folding seat back 64 that folds down to accommodate a litter across one or more adjacent seats. Also similar to the previous embodiment, EA seat 60 is mountable to the vehicle compartment from behind the seat via two EA mounts 69. In the depicted embodiment, each EA mount 69 incorporates a guide rod, mounting bracket, slide block, and EA link in much the same manner as described in reference to the previous embodiment. However, EA seat 60 further comprises a litter support 66 mounted behind the seat back 64 via its own EA mount. The litter support 66 comprises a folding arm 67 that is moveable from the vertical, stowed position shown in FIG. 8 when the seat back 64 is upright, to the horizontal, deployed position shown in FIG. 9 when seat back 64 is folded down against the seat bottom.

Figure 10:
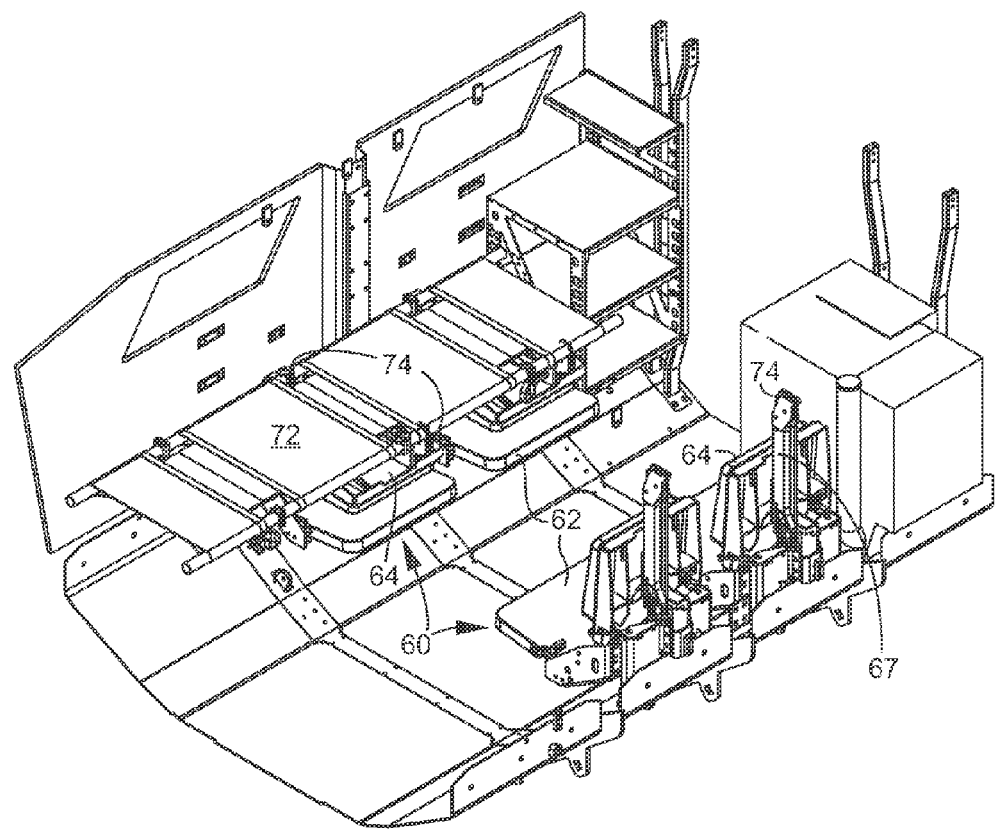
FIG. 10 is a perspective cut-away view of a military vehicle compartment containing two rows of the seats shown in FIGS. 8 and 9, with one row deployed for seating, and the other row supporting a medical litter.

Referring to FIG. 10, seat 60 is illustrated in the context of a vehicle installation consisting of two adjacent, inward facing seats 60 installed along each side of an exemplary military vehicle compartment shown partially cut away. On the right side of the compartment both seats are configured for seating as in FIG. 8, with the seat backs 64 upright and litter supports 66 in the vertical, stowed position. On the left side, the seat backs 64 are folded down, and the litter support arms 67 are in the horizontal, deployed position of FIG. 9, with a medical litter 72 disposed atop the deployed arms 67. The litter is secured to the seats 60 by hook latches 74 at each end of arms 67 adapted to lock onto the litter frame members. Of course all the seats on both sides of a vehicle compartment could be configured for seating as in the right side of FIG. 10, or for receiving a litter as in the left side of FIG. 10.

Figure 11:
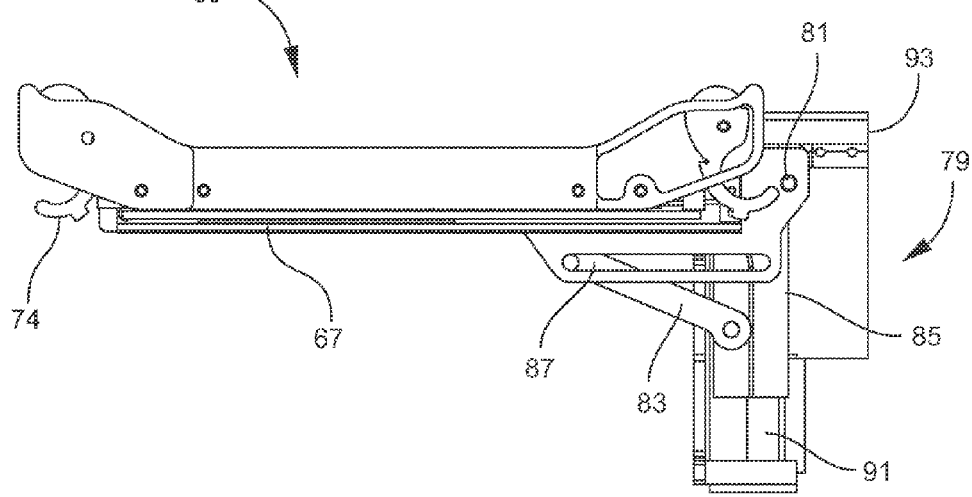
FIGS. 11 through 13 are perspective views of the folding litter support arm of FIG. 8 in horizontal, vertical, and stowed positions.
Figure 12:
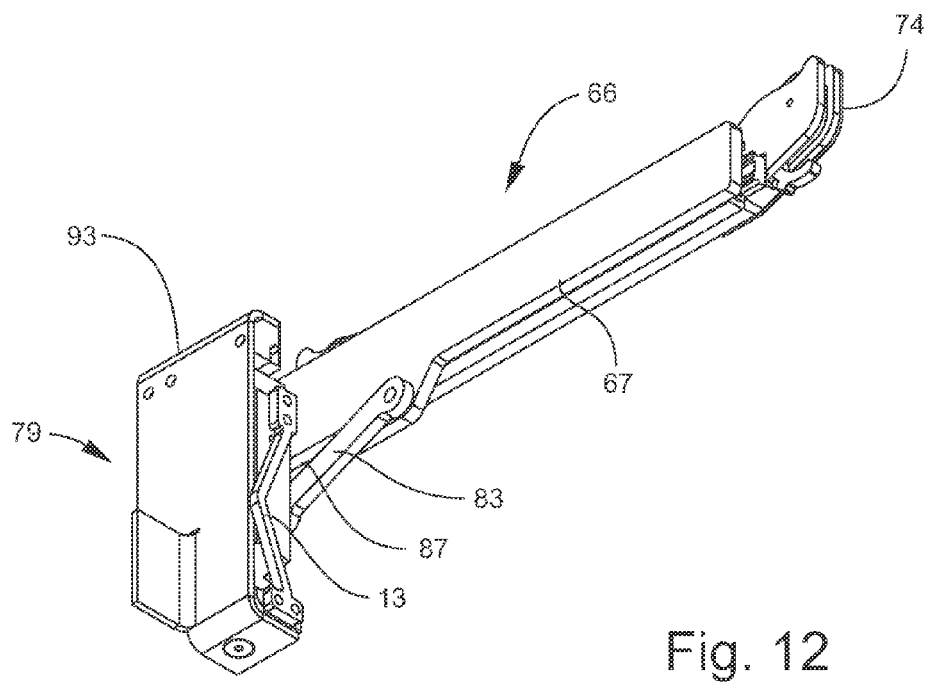
Figure 13:
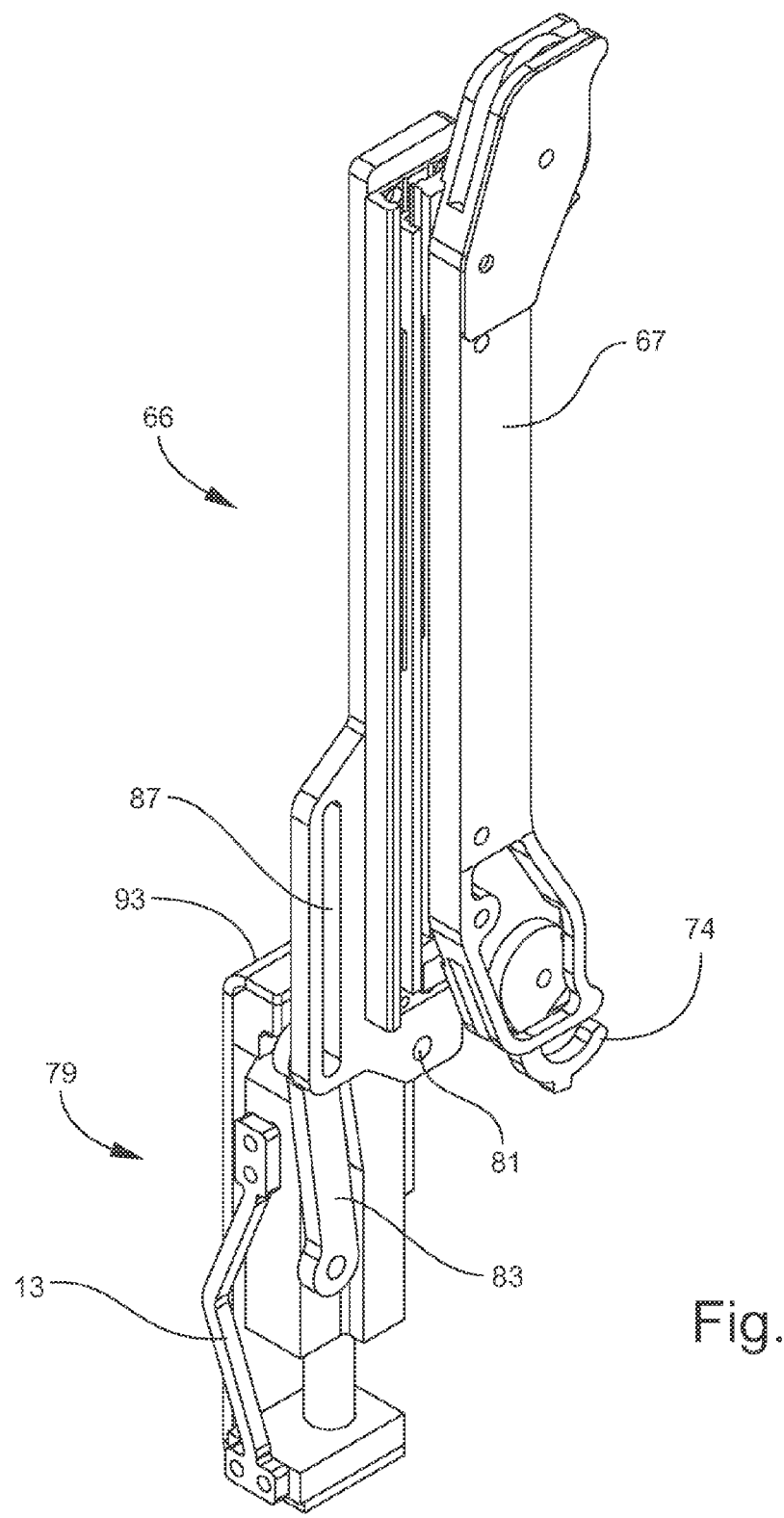

Referring now to FIGS. 11 through 13, litter support 66 comprises generally the folding arm 67, an EA mount 79, and a brace 83 supporting arm 67 against EA mount 79. In FIGS. 11 and 12, arm 67 is in horizontal position of FIG. 10, while in FIG. 13 the arm is in the vertical, stowed position as in FIG. 9. Arm 67 is connected to EA mount 79 at pivot joint 81; and a slot 87 along a lower portion of arm 67 provides a guided connection to a first end of brace 83. A second end of brace 83 is pivotally connected to EA mount 79 substantially below the position of slot 67. As arm 67 is rotated about pivot joint 81, brace 83 pivots about its second end, while the first end slides along slot 87. Link 83, arm 67, and EA mount 79 thus comprise essentially a four bar linkage, with the dimensions of slot 87 determining the range of motion of arm 67.

The energy attenuating mechanism of EA mount 79 is constructed of fundamentally the same elements described in reference to the previous seat embodiment, namely a guide rod 91, mounting bracket 93, slide block 85, and EA link 13. Mounting bracket 93 and guide rod 91 comprise the fixed portion of EA mount 79. Slide block 85 is the moveable portion, and supports litter arm 67 at pivot joint 81 and through brace 83. The EA link 13 is connected between slide block 85 and a flange at the lower end of mounting bracket 93, preventing slide block 85 from sliding downward along guide rod 91 under non-catastrophic loading conditions. Thus a load supported by arm 67, such as a litter with a patient, is transmitted directly through EA link 13 to the mounting bracket 93 and vehicle structure, completely independent of the seat EA mounts 69. Accordingly the EA link 13 of mount 79 may be tuned to provide a level of shock absorption appropriate for the litter only. Although functionally independent, the litter EA mount 79 and the seat EA mounts 69 may all be bolted to a common mounting plate 95 (see FIG. 9) forming the back of seat 60 that is adapted for supporting the seat 60 within the vehicle compartment.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims. For example, although the illustrated embodiments show a medical litter being supported by two side-by-side seats, a litter could be supported on three or more adjacent seats. Further, while individual seats have been depicted, it should be appreciated that the EA seat and litter support of the present disclosure may encompass various bench seating configurations. An exemplary energy attenuating bench seat is disclosed in issued U.S. Pat. No. 7,938,485, entitled "Variable Displacement Seating Assembly", assigned to the assignee of the present disclosure, the entire contents of which are hereby incorporated by reference.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating seat and litter support for use in a vehicle, comprising:
    a seat with a folding back that is lockable in both an upright position for seating, and a folded down, horizontal position;
    a litter support comprising a folding arm moveable between an upright, stowed position and a horizontal, litter mounting position;
    an energy attenuating mount supporting the folding arm; and
    an energy attenuating mount supporting the seat within the vehicle, wherein the energy attenuating mount supporting the folding arm, and the energy attenuating mount supporting the seat, are both supported by a common seat mounting plate.

2. The energy attenuating seat and litter support of claim 1, wherein the seat comprises at least two side-by-side mounted seats.

3. The energy attenuating seat and litter support of claim 1, wherein the seat energy attenuating mount comprises a seat guide adapted to allow guided vertical movement of the seat, and one or more energy attenuating links vertically supporting the seat from the vehicle.

4. The energy attenuating seat and litter support of claim 3, wherein the seat guide comprises a fixed guide rod portion connected to the vehicle, and a slide block portion disposed on the guide rod and connected to the seat.

5. The energy attenuating seat and litter support of claim 1, wherein the one or more energy attenuating links comprise a deformable metal bar with straight portions and bends.

6. The energy attenuating seat and litter support of claim 1, wherein the folding arm further comprises latches at each end adapted for securing a litter frame member to the litter support arm.

7. The energy attenuating seat and litter support of claim 1 wherein each seat is supported within the vehicle by two energy attenuating mounts.

8. The energy attenuating seat and litter support of claim 1, wherein the folding arm energy attenuating mount comprises folding arm guide adapted to provide guided vertical movement of the folding arm, and one or more energy attenuating links vertically supporting the folding arm from the vehicle.

9. The energy attenuating seat and litter support of claim 8, wherein the folding arm guide comprises a fixed guide rod portion connected to the vehicle, and a slide block portion disposed on the guide rod and connected to the folding arm.

10. The energy attenuating seat and litter support of claim 8, wherein the one or more energy attenuating links comprise a deformable metal bar with straight portions and bends.

\* \* \* \* \*